United States Patent

[11] 3,530,829

[72] Inventor Allan H. Willinger
 56 Gail Drive, New Rochelle, New York 10805
[21] Appl. No. 759,545
[22] Filed Sept. 13, 1968
[45] Patented Sept. 29, 1970

[54] FLOATING COVER FOR AN AQUARIUM
 5 Claims, 3 Drawing Figs.

[52] U.S. Cl. ............................................... 119/5
[51] Int. Cl. ........................................... A01k 63/00
[50] Field of Search ..................................... 119/5

[56] References Cited
UNITED STATES PATENTS
3,018,758  1/1962  Arnould ...................... 119/5
3,234,905  2/1966  Olson .......................... 119/5

Primary Examiner—Hugh R. Chamblee
Attorney—Friedman and Goodman

ABSTRACT: A cover for an aquarium tank floatingly supported on the water body thereof so as to prevent fish from jumping out and to minimize evaporation, dirt and dust contamination of the water, as well as providing other benefits, and wherein depending flotation members hold the cover in a clearance position above the water and thereby keep the cover from interfering with the interchange of gases between the atmosphere and the water necessary to sustain fish and plant life.

Patented Sept. 29, 1970
3,530,829
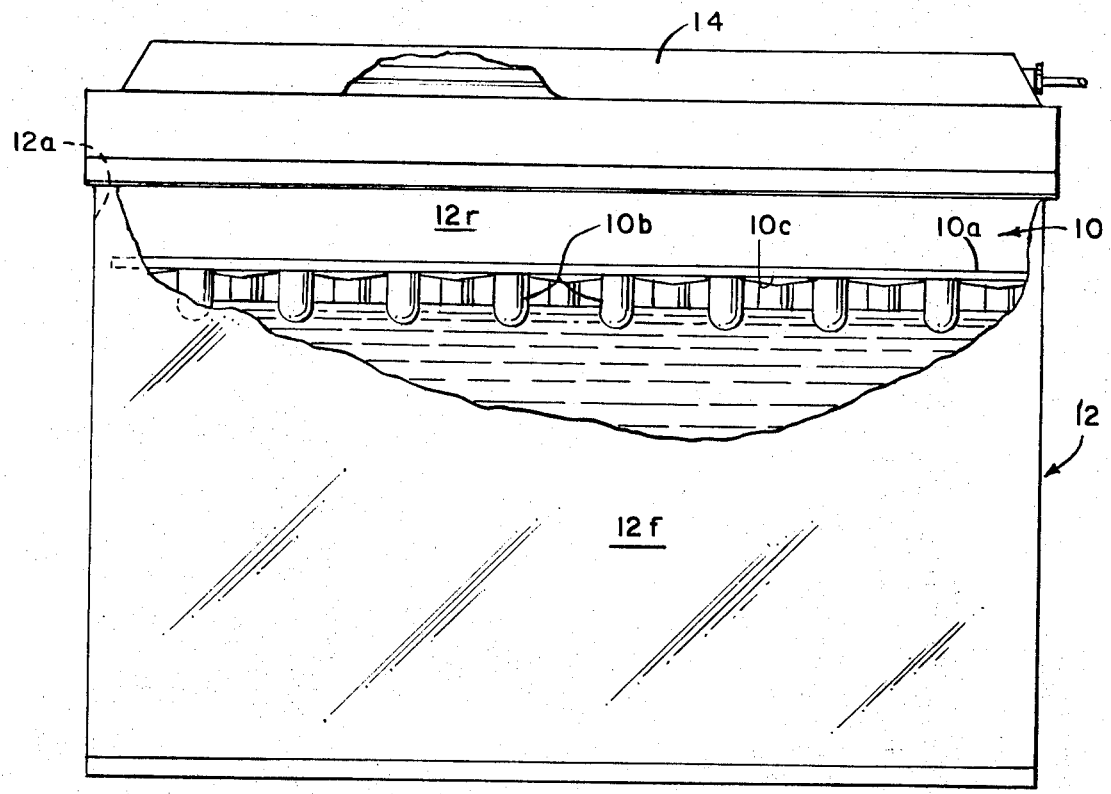
FIG. 1.
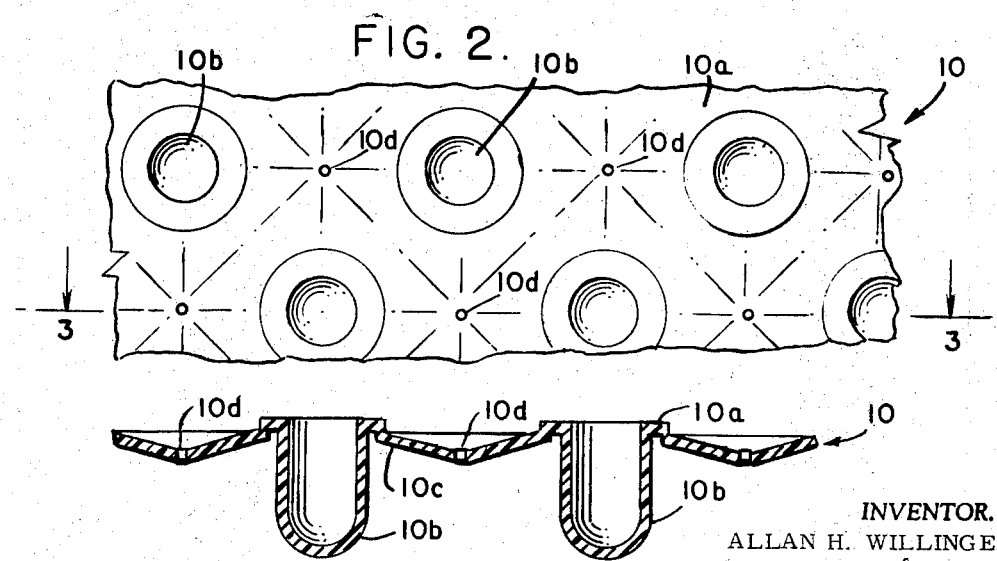
FIG. 2.
FIG. 3.
INVENTOR.
ALLAN H. WILLINGER
BY Friedman & Goodman
Attorneys

FLOATING COVER FOR AN AQUARIUM

The present invention relates generally to improvements for an aquarium, and more particularly to a floating cover for the aquarium tank.

As generally understood, the maintenance of proper and favorable growth conditions for an aquarium, as well as maintaining optimum display conditions, usually requires a considerable amount of auxiliary equipment in addition to the actual aquarium tank. Exemplary of this auxiliary equipment is an air pump which using flexible tubing bubbles air through the water (called "artificial aeration") and a water filtering system effective to remove dirt and other contaminants from the water and, to enhance the display of the tank, resort is commonly made to a light source appropriately mounted in the tank opening directing its light into the tank. This auxiliary equipment is specifically mentioned since it effectively highlights the benefits to be derived from the use, as herein proposed, of a novel floating cover for the aquarium tank. As may be readily appreciated, this proposed cover, preferably fabricated of transparent plastic, does not detract from the aquarium display and, due to its advantageous protective position over the water body, it obviously practically eliminates evaporation and condensation upon the light source previously noted, and although it does not necessarily eliminate the need for a water filtering system, it greatly lessens the amount of dirt and dust contamination of the water requiring removal by the filtering system. The cover also prevents the water that splashes from the breaking of aeration bubbles at the surface, from soaking the wires, sockets and switches in the light source. This "splashing" water also tends to build up mineral deposits on the electric lamps, wires, sockets, and switch means creating an electrical hazard as well as oftentimes shorting out the electrical components. This just-noted cover protective position, however, could seriously interfere with the interchange of gases between the water and the atmosphere and since artificial aeration is oftentimes suspended periodically due to a faulty air pump, or power line failure, or by the aquarium keeper to eliminate air pump or aeration or filtering noises during bedtime, for instance, the fish would promptly suffocate, since water absorbs oxygen in relation to its surface area exposed to the atmosphere. Some types of fish rely upon breathing atmospheric air at the surface, and all fish, in the event the water becomes polluted and devoid of oxygen can temporarily rely on the atmosphere for their oxygen supply. Many varieties of fish also suck the surface of the water pulling in floating particles of fish food for their sustenance. The foregoing probably accounts for the absence of such floating covers as auxiliary equipment for aquariums.

Broadly, it is an object to provide an effective functioning aquarium tank cover which achieves the foregoing enumerated benefits, but without interfering with or otherwise adversely affecting other desired conditions of the aquarium. Specifically, it is an object to provide a cover which is floatingly supported on the water body, but in a clearance position therefrom, such that there is ample interchange of gases between the atmosphere and the water body in the area beneath the cover.

A cover demonstrating objects and advantages of the present invention, in its simplest and preferred form, includes a transparent, thermo-formed or injection molded thin gauge plastic body which has areas thereof, during its manufacture, formed into depending bodies which are adapted to be projected into the water body and are effective to cause sufficient water displacement to floatingly support the bottom cover surface above the water.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a front elevational view of an aquarium tank having a front wall partially broken away to better illustrate the operative floating position of the floating cover hereof;

FIG. 2 is an isolated, partial view of the floating cover, on an enlarged scale, and as viewed in perspective from above, illustrating further structural features of the cover; and FIG. 3 is a side elevational view, in section, taken on line 3-3 of FIG. 2, illustrating still further structural features.

Reference is now made to the drawings wherein there is shown a floating cover 10 in its operative floating position within a conventional aquarium tank 12. More particularly, tank 12 will be understood to be generally rectangular in shape, having opposing side walls and a bottom wall (not numbered) and a rear and front wall 12r, 12f, respectively, which cooperate to define an internal space or volume which is filled with a body of water W and used, as generally understood, to maintain an aquarium. The upper portions of the walls defining the tank 12 bound an upper tank opening 12a into its interior which, of course, is of a rectangular shape and size coextensive with that of the internal volume of the tank 12. The previously noted operative floating position of the cover 10 is a position disposed within the tank 12 floatingly supported on the water body W and serving as a closure for the tank opening 12a, preventing fish from jumping out and whereby dust and dirt is prevented from falling into the water body W, evaporation of water from the tank is minimized, as well as other advantages and benefits being derived. Specifically, the minimizing of evaporation is particularly noteworthy in instances where the aquarium tank 12, as exemplified by the embodiment illustrated herein, has a light 14 which is advantageously mounted over the tank opening 12a since such evaporated water condenses on the electric wiring, switches and sockets often causing shorting and other malfunctioning of the light 14.

Referring now specifically to the construction of the cover 10, the same will be understood to be preferably fabricated of transparent plastic in a thin gauge, and specifically by the vacuum-forming or thermoforming process. Thus, the cover body 12a is comparatively lightweight, easily cut with a common household scissors to provide access openings for auxiliary equipment and/or feeding access, and readily floatingly supported upon the water W. The thin gauge plastic traps the evaporated aquarium water condensate and due to the thin gauge the water prevents the heat of the aquarium light bulbs from distorting the plastic. The size of the cover body should be just slightly less than the size of the tank opening 12a so that there is very little area between the peripheral edge of the cover and the wall bounding the opening 12a. Use of the cover 10, however, cannot be permitted to interfere with the interchange of gases between the atmosphere and the water W and thus, during the vacuum forming of the cover body 10a, provision is made, in a well understood manner, for shaping select wall portions into hollow, depending bodies 12b, preferably in an alternating spaced relation, as best shown in FIG. 2. The depending bodies 10b effectively serve as flotation means by displacing an appropriate amount of water with their free ends projected into the water body W so that the cover 10, and particularly the lower cover surface 10c thereof occupies a clearance position above the upper surface of the water body W. Naturally, within this clearance there is effective interchange of gases between the atmosphere and the water body W for proper maintenance of the aquarium.

In areas not occupied by the depending flotation bodies 10b, the cover body 10a may advantageously be provided with very small diameter openings 10d for the return of any accidentally spilled water on the upper surface of the cover 10. The openings 10b also allow gases to circulate augmenting the opening around the peripheral edge of the cover.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

I claim:

1. A floating cover for an aquarium tank formed by cooperating walls defining an internal volume for the storage of a body of water and bounding an upper opening of a prescribed extent into said tank, said floating cover comprising a body of an extent substantially equal to that of said tank opening having an operative position effectively closing said tank opening with one surface thereof in facing relation to the upper surface of said stored body of water within said tank, and flotation means depending from said cover effective to floatingly support the cover upon said stored body of water with said one surface thereof in a clearance position from said body of water, whereby there is a continued interchange of gases between the atmosphere and said covered aquarium water body.

2. A floating cover for an aquarium as defined in claim 1, wherein said cover body is substantially planar and said flotation means are body portions projected out of the plane of said body.

3. A floating cover for an aquarium as defined in claim 2, wherein said depending body portions are alternately spaced in said cover body.

4. A floating cover for an aquarium as defined in claim 2, wherein said body includes small diameter openings therein.

5. A floating cover for an aquarium as defined in claim 2, wherein said cover body is fabricated of transparent plastic.